United States Patent [19]

Faulkner

[11] Patent Number: 5,431,275
[45] Date of Patent: Jul. 11, 1995

[54] CONVEYOR BELT WITH ROTATABLE TAPERED LINK SHIFT

[75] Inventor: William G. Faulkner, 6701 Newman Dr., Oklahoma City, Okla. 73162

[73] Assignee: William G. Faulkner, Oklahoma City, Okla.

[21] Appl. No.: 250,242

[22] Filed: May 27, 1994

Related U.S. Application Data

[63] Continuation-in-part of Ser. No. 138,543, Oct. 15, 1993, Pat. No. 5,358,096, which is a continuation of Ser. No. 69,057, May 27, 1993, Pat. No. 5,318,169.

[51] Int. Cl.⁶ .............................................. B65G 17/06
[52] U.S. Cl. ..................... 198/853; 198/852; 198/778
[58] Field of Search ................. 198/778, 831, 852, 853

[56] References Cited

U.S. PATENT DOCUMENTS

| | | | |
|---|---|---|---|
| D. 319,328 | 8/1991 | Faulkner | D34/29 |
| 3,774,752 | 11/1973 | Harvey | 198/852 |
| 4,429,785 | 2/1984 | Dango | 198/852 |
| 4,645,070 | 2/1987 | Homeier | 19/853 X |
| 4,934,517 | 6/1990 | Lapeyre | 198/852 |
| 4,972,942 | 11/1990 | Faulkner | 198/853 |
| 5,020,656 | 6/1991 | Faulkner | 198/853 X |
| 5,065,860 | 11/1991 | Faulkner | 198/853 X |
| 5,131,526 | 7/1992 | Kaak | 198/778 |
| 5,137,141 | 8/1992 | Irwin | 198/778 |
| 5,139,135 | 8/1992 | Irwin et al. | 198/852 |
| 5,141,099 | 8/1992 | Baumgartner | 198/778 |
| 5,165,514 | 11/1992 | Faulkner | 198/347.3 |
| 5,174,439 | 12/1992 | Spangler | 198/852 X |
| 5,181,601 | 6/1993 | Palmaer | 198/852 X |
| 5,215,185 | 6/1993 | Counter et al. | 198/853 |
| 5,224,583 | 7/1993 | Palmaer et al. | 198/779 |
| 5,310,046 | 5/1994 | Palmaer et al. | 198/852 X |

FOREIGN PATENT DOCUMENTS

0680994 2/1964 Canada ............................... 198/853

Primary Examiner—James R. Bidwell
Attorney, Agent, or Firm—Dunlap & Codding

[57] ABSTRACT

A spiral conveyor belt comprising a plurality of link assemblies adapted to be interconnected so as to permit coplanar rotational movement relative to one another. Each of the link assemblies having a plurality of forward link ends and a plurality of rearward link ends. A link shaft is disposed through the forward link ends and the rearward link ends of adjacent link assemblies for interconnecting the link assemblies to form the spiral conveyor belt. Each of the link shafts is tapered at least near the first end thereof to permit movement of the tapered portion of the link shaft in shaft openings in the forward and rearward link ends as the spiral conveyor belt is turned on a radius. In a second embodiment, the link shafts have a longitudinal axis, a straight surface for carrying the tensile load between adjacent link assemblies as the conveyor belt is traveling along a straight path, and a tapered surface for carrying the tensile load between adjacent link assemblies as the conveyor belt is traveling on the radius, the tapered surface disposed angularly about the longitudinal axis relative to the straight surface and the tapered surface intersecting the straight surface so as to form a transition zone along which the tensile load on the straight surface is rotatably transferred to the tapered surface when the conveyor belt changes from traveling along the straight path to traveling on the radius.

9 Claims, 9 Drawing Sheets

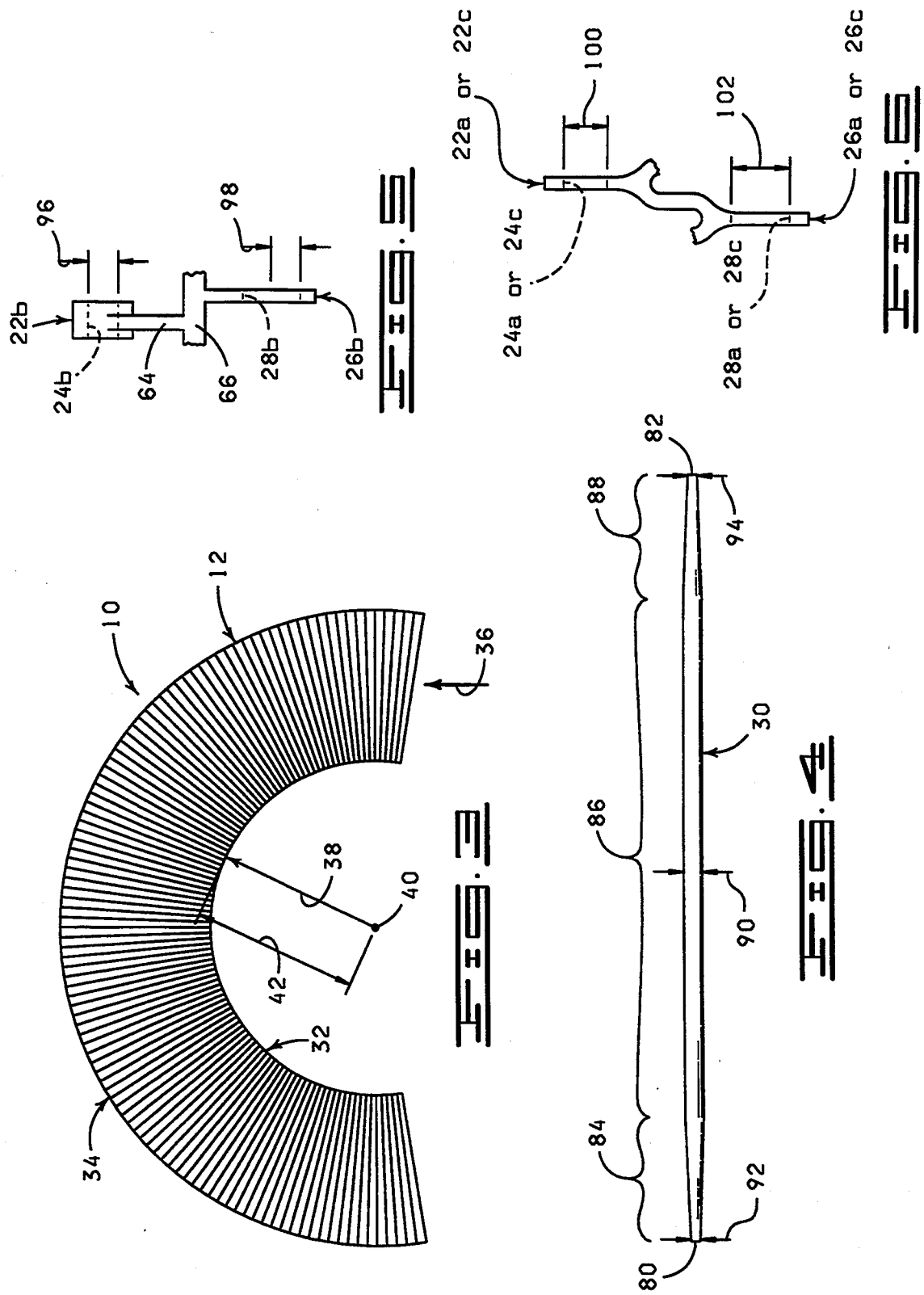

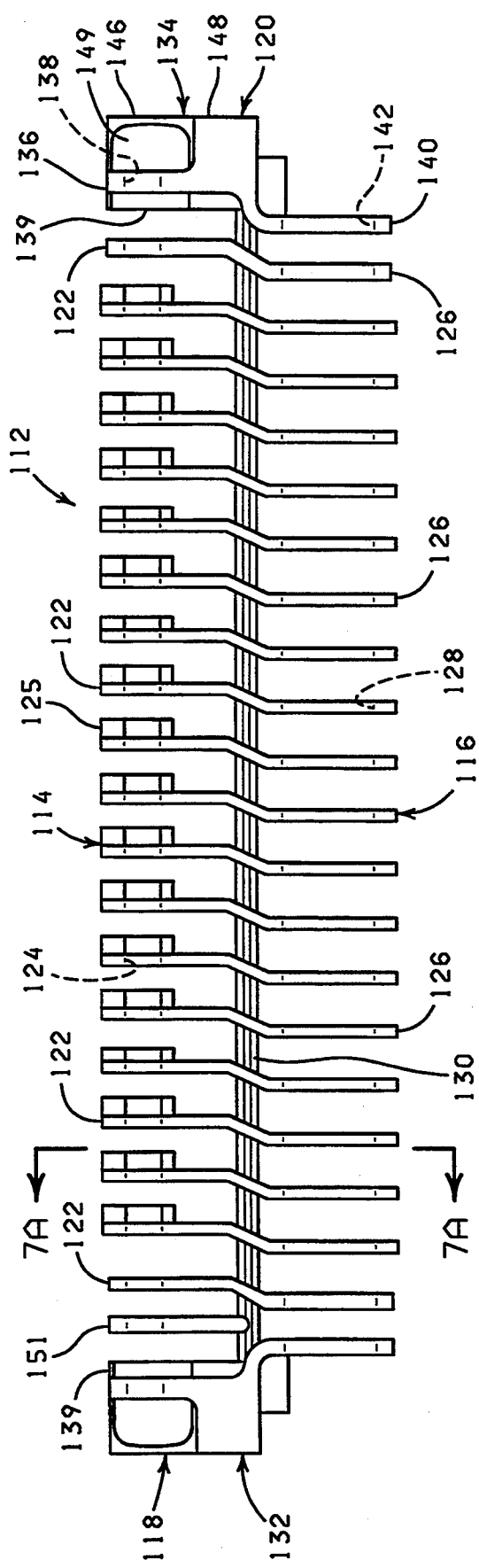
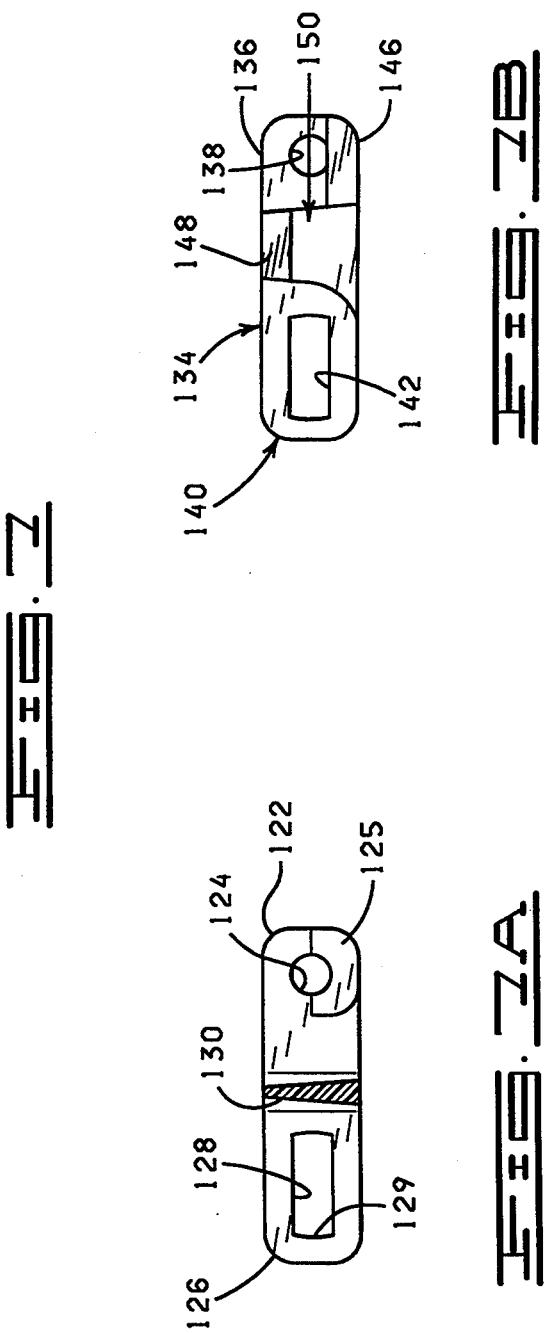
FIG. 7
FIG. 7A
FIG. 7B

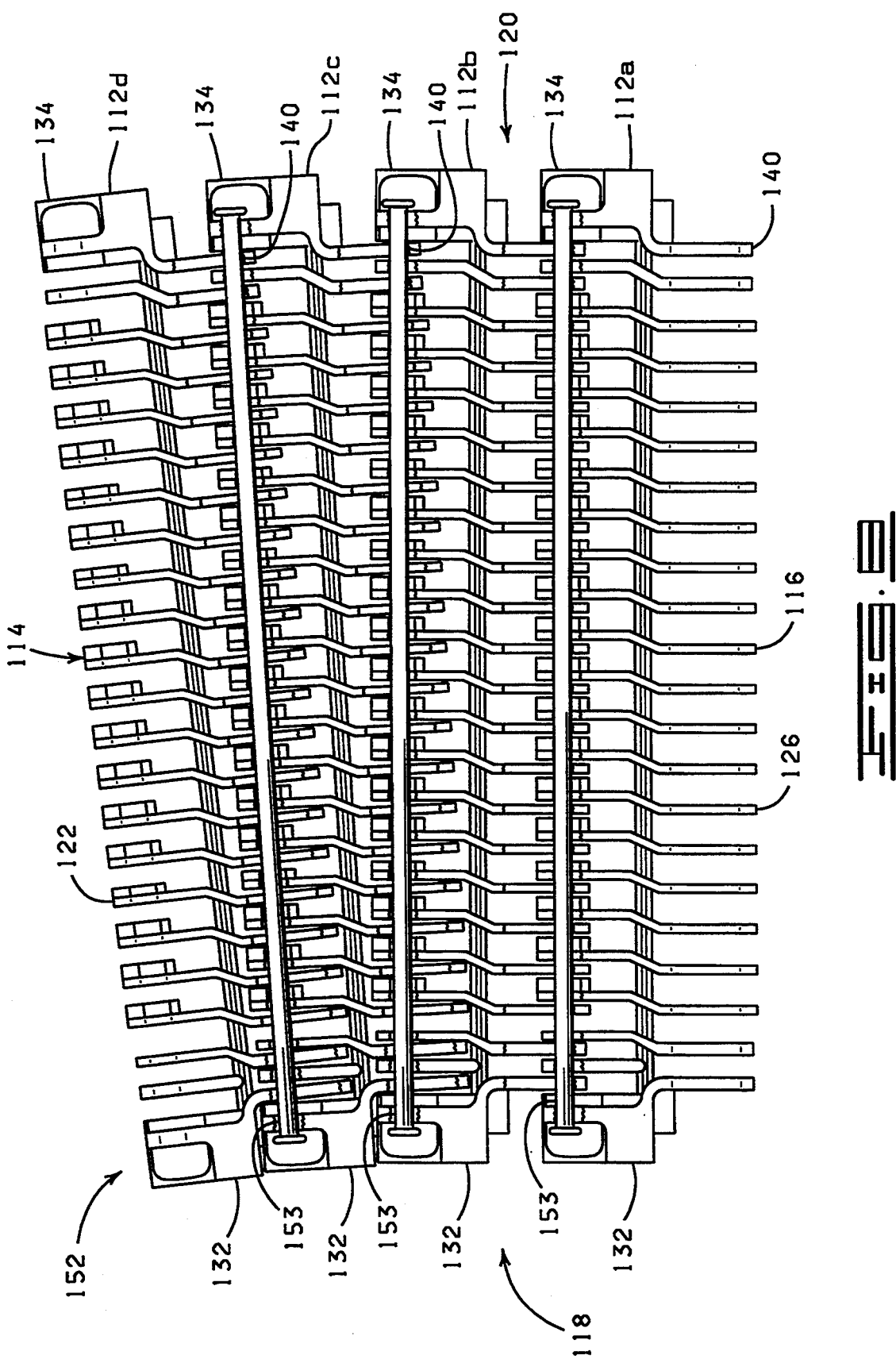

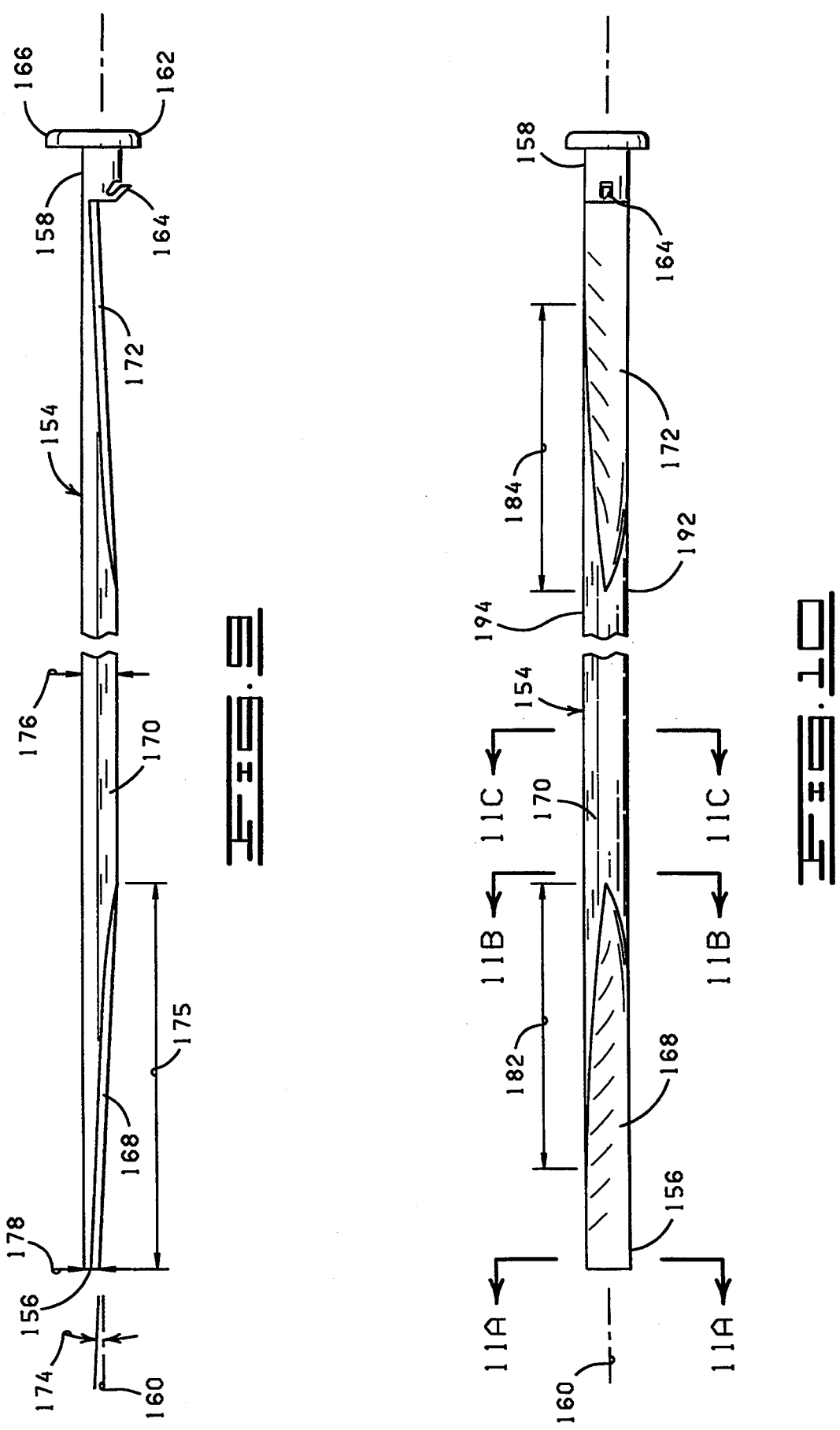

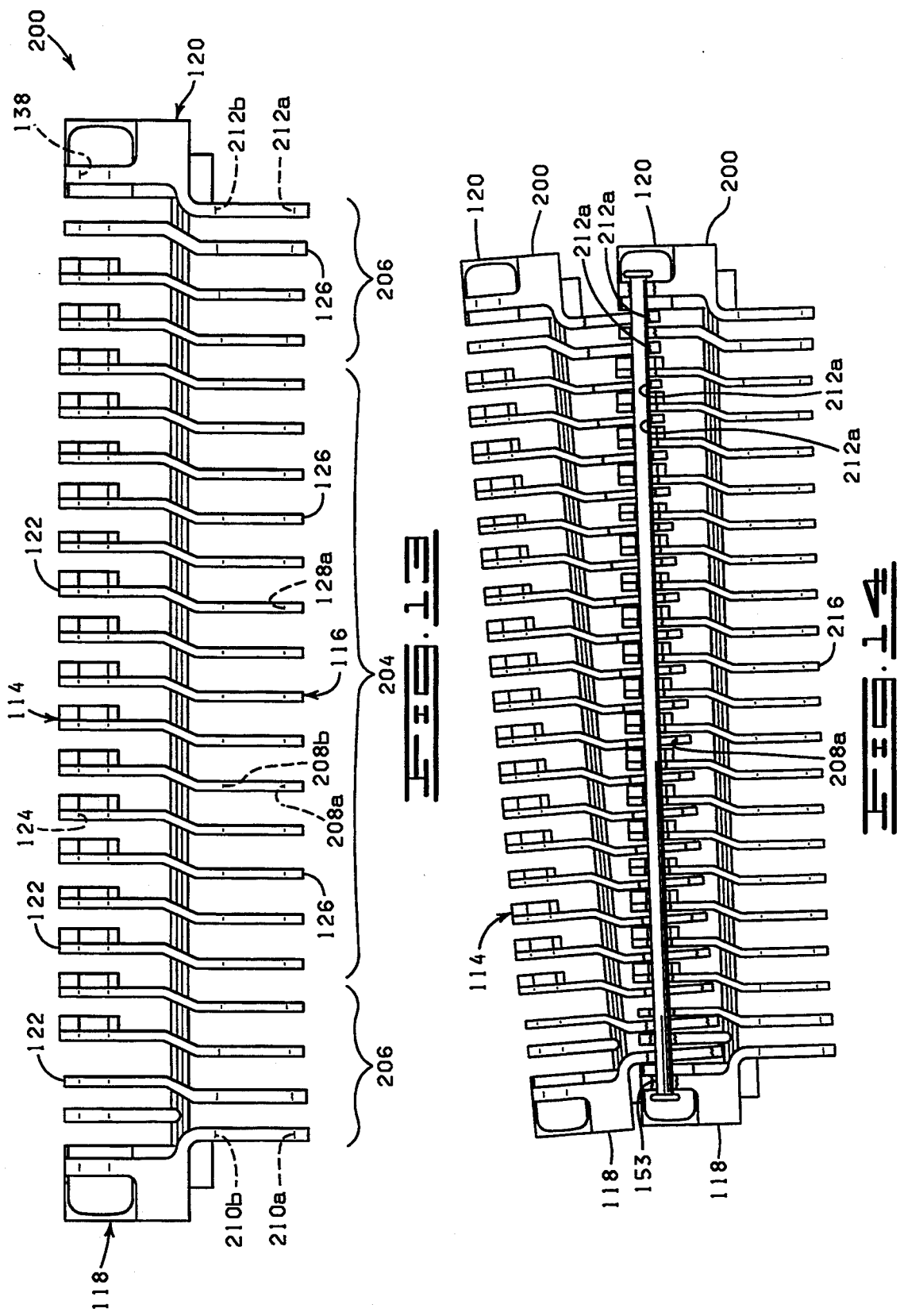

5,431,275

CONVEYOR BELT WITH ROTATABLE TAPERED LINK SHIFT

CROSS REFERENCE TO RELATED APPLICATIONS

This application is a continuation-in-part of U.S. Ser. No. 08/138,543, filed Oct. 15, 1993, U.S. Pat. No. 5,358,096, which is a continuation of U.S. Ser. No. 08/069,057, filed May 27, 1993, U.S. Pat. No. 5,318,169.

FIELD OF THE INVENTION

The present invention relates generally to conveyor belts and more particularly, but not by way of limitation, to a conveyor belt adapted to be turned on a radius.

BRIEF DESCRIPTION OF THE DRAWINGS

FIG. 3 is a diagrammatic view showing a plurality of link assemblies in diagrammatic line form as the spiral conveyor belt is turned on a radius.

FIG. 4 is an elevational view of a tapered link shaft.

FIG. 5 is a plan view of a forward link end and rearward link end in the second section of each of the link assemblies of FIG. 2.

FIG. 6 is a plan view of a forward link end and rearward link end in a first or third section of the link assemblies of FIG. 2.

FIG. 7 is a top view of another link assembly constructed in accordance with the present invention. FIG. 7A is a cross section taken at 7A—7A in FIG. 7. FIG. 7B is a side view of the link assembly of FIG. 7.

FIG. 8 is a partially cutaway, top view of four link assemblies interconnected with a conventional round link shaft, the link assemblies are illustrated traveling along a straight path and a radial path.

FIG. 9 is side view of a twist link shaft constructed in accordance with the present invention.

FIG. 10 is a top view of the twist link shaft of FIG. 9.

FIG. 13 is a top view of another link assembly constructed in accordance with the present invention.

FIG. 14 is a partially cutaway, top view of two link assemblies interconnected with a round link shaft and illustrated traveling along a radial path.

DETAILED DESCRIPTION

There are many instances when it is necessary for a conveyor belt to be turned on a radius for various reasons such as merely changing the direction of travel. Various problems occur when turning a conveyor belt on a radius which limit the radius on which a given conveyor belt can be turned. One problem for example with prior conveyor belts has been that the load placed on the plurality of links which make up the conveyor belt is transferred to the outer most link as the conveyor belt is turned on a radius. This often leads to the breakage of the outer most link.

To permit conveyor belts to be turned on a radius, the holes in the link assemblies where the link shafts extend through have been elongated or enlarged to accommodate the compression or expansion of the link assemblies as the conveyor belt is turned on a radius. There is a limit of course to how large a hole can be made or elongated to accommodate this expansion or compression of the link assemblies. The present spiral conveyor belt is designed and constructed to permit a given size of conveyor belt to turn on a smaller radius as compared to prior art spiral type conveyor belts, as well as, to transfer the load over a greater number of links as the conveyor belt is being turned on a radius.

The present invention comprises a spiral conveyor belt 10 (partially shown in FIG. 2 and partially and diagrammatically shown in FIG. 3) which is adapted to turn on a radius. The spiral conveyor belt 10 comprises a plurality of link assemblies 12 adapted to be interconnected so as permit coplanar rotational movement relative to one another when assembled in a manner discussed hereinbelow. Each of the link assemblies 12 preferably is constructed of a plastic or ceramic material, although they could be constructed of metal. A typical link assembly 12 is shown in FIG. 1 and four link assemblies 12 are shown in FIG. 2 interconnected to form a portion of the spiral conveyor belt 10 and the link assemblies 12 are diagrammatically shown in FIG. 3 as straight lines with each link assembly being represented in FIG. 3 by two straight lines spaced a distance apart and disposed about adjacent each other.

Figure 1:
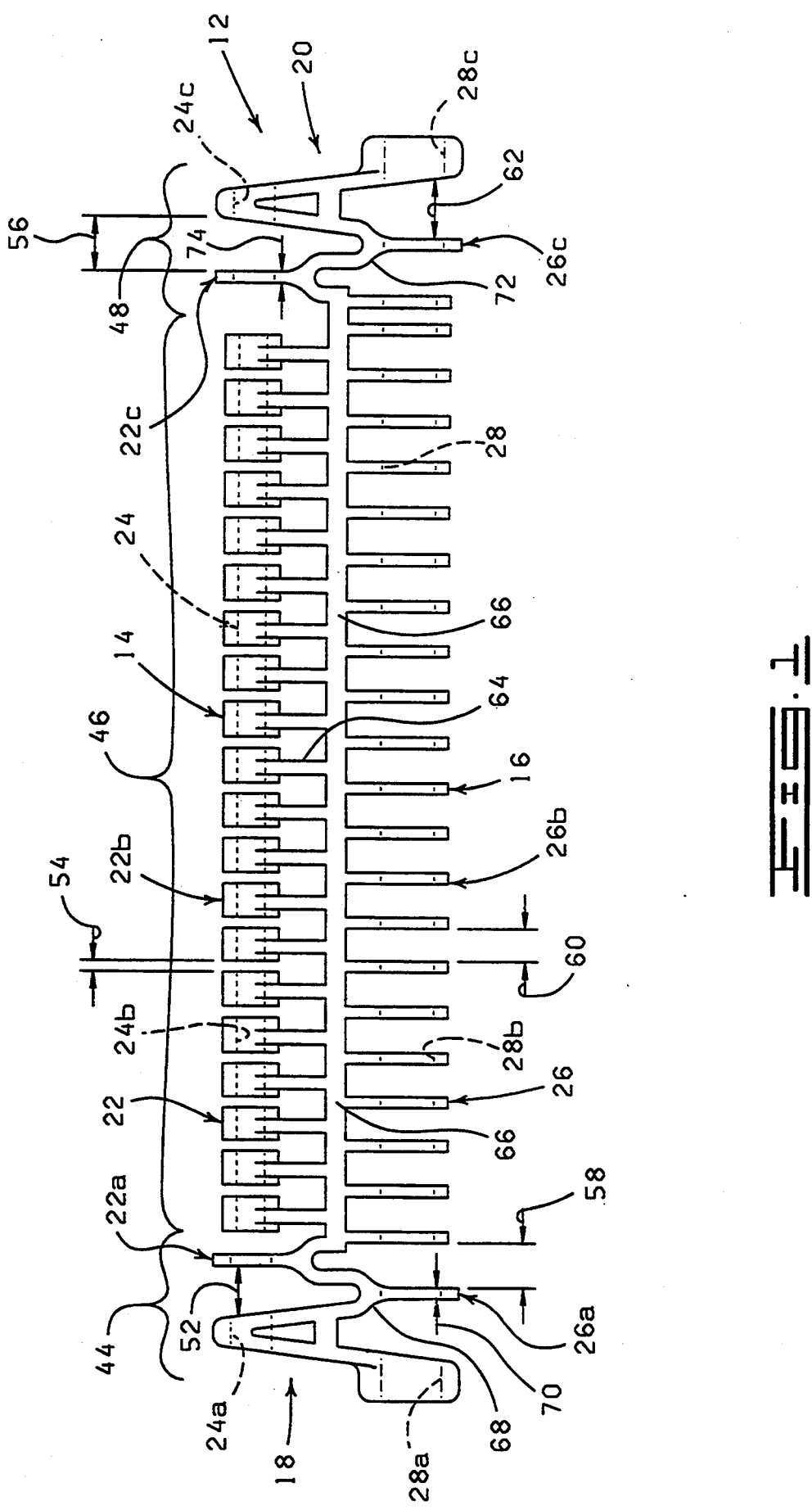
FIG. 1 is a top view showing a link assembly constructed in accordance with the present invention.
Figure 2:
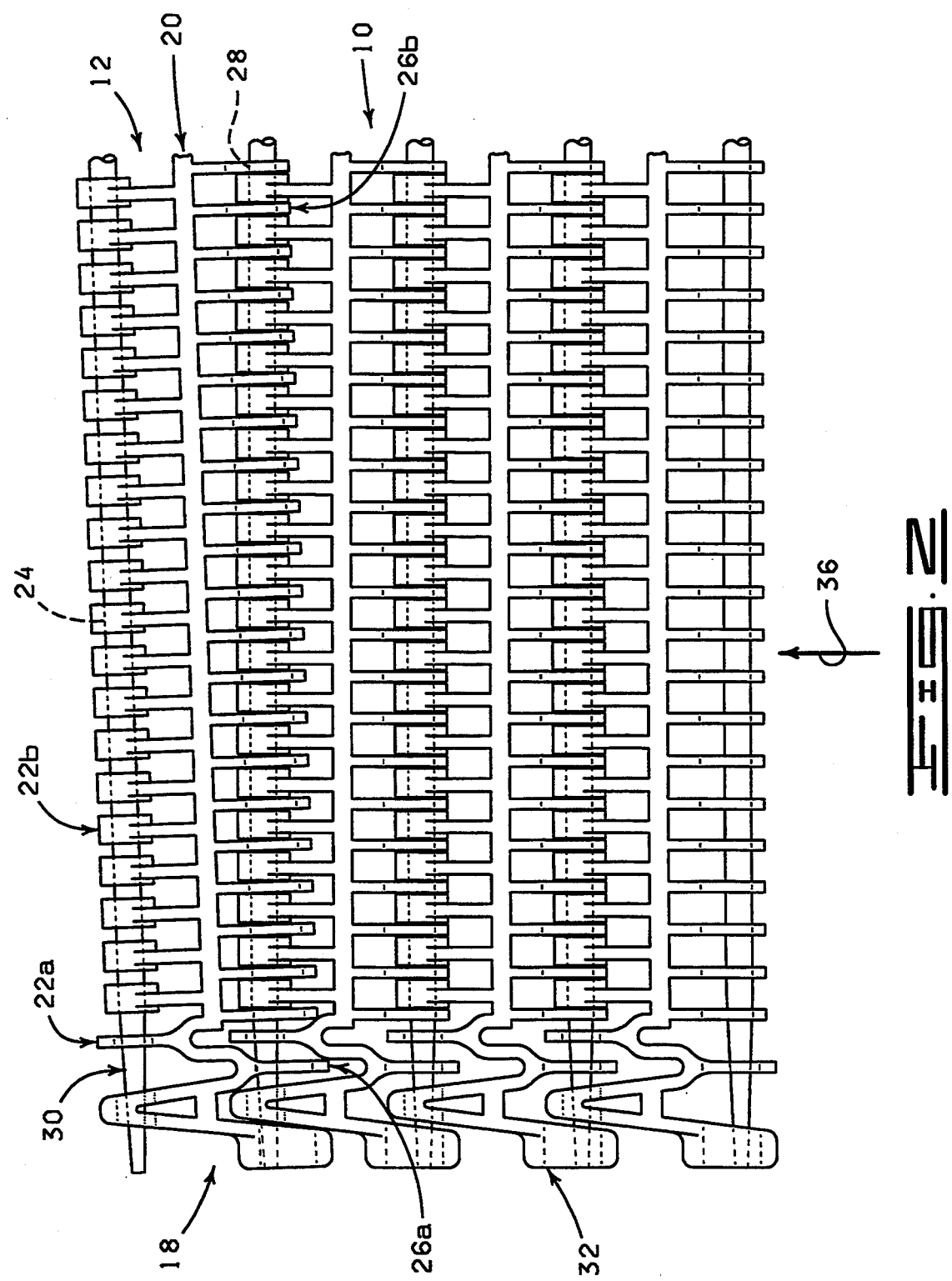
FIG. 2 is a top view showing four link assemblies interconnected to form a spiral conveyor belt, the link assemblies being shown in a position where the spiral conveyor belt is starting to turn on a radius.

Each link assembly 12 includes a forward end 14 (FIG. 1), a rearward end 16 (FIG. 1), a first side 18 (FIG. 1) and a second side 20 (FIG. 1).

A plurality of forward link ends 22 (FIGS. 1 and 2) are formed on the forward end 14 of each link assembly 12. The forward link ends 22 on each link assembly 12 are spaced a distance apart and spaced along the forward end 14 of the link assembly 12. A forward shaft opening 24 (shown in FIGS. 1 and 2 in dashed lines) is formed through each of the forward link ends 22. The forward shaft openings 24 are generally aligned.

A plurality of rearward link ends 26 (FIGS. 1 and 2) are formed on the rearward end 16 of each of the link assemblies 12. The rearward link ends 26 on each of the link assemblies 12 are spaced a distance apart and spaced along the rearward end 16 of each link assembly 12. A rearward shaft opening 28 (shown in dashed lines in FIGS. 1 and 2) is formed through each of the rearward link ends 26. The rearward shaft openings 28 are oblong shaped and generally aligned to allow for translational movement of the rearward link ends 26 relative to the forward link end 22 of an adjacent link assembly 12.

The forward end 14 of each link assembly 12 is disposed near the rearward end 16 of one of the other link assemblies 12 and positioned so that the forward link ends 22 on each of the link assemblies 12 are positioned between the rearward link ends 26 on one of the other link assemblies 12 with the forward shaft opening 24 being aligned with the rearward shaft openings 28. More particularly, each of the forward link ends 22 on each of the link assemblies 12 is disposed between two adjacent rearward link ends 26 on one of the other link assemblies 12 with the forward shaft openings 24 and the rearward shaft openings 28 being aligned.

The spiral conveyor belt 10 includes a plurality of link shafts 30 (only one of the link shafts 30 being designated with a reference numeral in FIG. 2). Each of the link shafts 30 is disposed through the aligned forward shaft openings 24 and rearward shaft openings 28 to interconnect each of the link assemblies 12 with one of the other link assemblies 12 to form the spiral conveyor belt 10.

The link assemblies 12 are connected to form the spiral conveyor belt 10 with a first side 32 (FIG. 3) and a second side 34 (FIG. 3). The spiral conveyor belt 10 may travel in a forward direction 36 (FIGS. 2 and 3) and is constructed to be turned on a radius 38 (FIG. 3) to the forward direction 36 of travel extending at an angle with respect to the forward direction 36 of travel.

As shown in FIG. 3, the spiral conveyor belt 10 is turned on the radius 38 through an angle of about one hundred eighty degrees. It should be noted that the spiral conveyor belt 10 may be turned on the radius 38 through any desired angle and the spiral conveyor belt 10 is shown in FIG. 3 as being turned through an angle of one hundred eighty degrees merely for illustrative purposes only. The radius 38 extends from a point 40 (FIG. 3) which is spaced a distance 42 (FIG. 3) from the first side 32 of the spiral conveyor belt 10.

Each of the link assemblies 12 is divided into a first section 44 (FIG. 1), a second section 46 (FIG. 1) and a third section 48 (FIG. 1). The first section 44 extends from about the first side 18 of the link assembly 12 a distance toward the second side 20 of the link assembly 12. The second section 46 extends from about the first section 44 a distance toward the second side 20 of the link assembly 12. The third section 48 extends from about the second section 46 to about the second side 20 of the link assembly 12. As shown in FIGS. 1 and 2, each of the link assemblies 12 is an integrally formed link assembly 12 constructed of a plastic or ceramic material and the sections 44, 46 and 48 are integrally constructed and connected. In some embodiments, the second section 46 may comprise multiple intermediate portions of the link assembly interconnected by the link shafts 30 to form the continuous link assembly 12. Alternately or in addition, the first and the third sections 44 and 48 may comprise separate elements interconnected with the second section 46 by the link shafts 30 to form the continuous link assembly 12. It also should be noted that, in some embodiments, the second section 46 may be constructed in a different manner as compared to the first and the third sections 44 and 46. For example, the second section 46 might comprise a solid flat top type of conveying element while the first and the third sections 44 and 48 comprise the link ends interconnected by the connecting members as illustrated in FIGS. 1 and 2 and as will be described in greater detail below.

The forward link ends 22 in the first section 44 are designated in FIGS. 1 and 2 with the reference numeral 22a, the forward link ends 22 in the second section 46 are designated in FIGS. 1 and 2 by the reference numeral 22b and the forward link ends 22 in the third section 48 are designated in FIGS. 1 and 2 by the reference numeral 22c in FIGS. 1 and 2.

The rearward link ends 26 are formed on the rearward end 16 of the link assemblies 12 as described before. The rearward link ends 26 in the first section 44 are designated in FIGS. 1 and 2 with the reference numeral 26a, the rearward link ends 26 in the second section 46 are designated in FIGS. 1 and 2 by the reference numeral 26b and the rearward link ends 26 in the third section 48 are designated by the reference numeral 26c in FIGS. 1 and 2.

The forward link ends 22a in the first section 44 are spaced apart a first distance 52 (FIG. 1). The forward link ends 22b in the second section 46 are spaced apart a second distance 54 (FIG. 1). The forward link ends 22c in the third section are spaced apart a third distance 56 (FIG. 1).

The rearward link ends 26a in the first section 44 are spaced apart a first distance 58 (FIG. 1). The rearward link ends 26b in the second section 46 are spaced apart a second distance 60 (FIG. 1). The rearward link ends 26c in the third section 48 are spaced apart a third distance 62 (FIG. 1).

In a preferred embodiment, the second distance 54 is slightly greater than the thickness of the rearward link ends 26b so that each of the rearward link ends 26b may be disposed in the space formed by the distance 54 between two of the forward link ends 22b. The first and the third distances 52 and 56 and the first and the third distances 58 and 62 each are sized to cooperate with the connecting members (described below) to permit the required compression and expansion between the forward link ends 22a and 22c and the rearward link ends 26a and 26c as the spiral conveyor belt 10 is turned on the radius 38.

It should be noted that the distances 52, 54, 56, 58, 60 and 62 all could be equal or all could be different in various embodiments of the present invention as desired in a particular application. The distances 54 and 60 are not critical with respect to the present invention and it only is necessary that the distance 54 be sized with respect to the thickness of the rearward link ends 26b so that the rearward link ends 26b can be slidably positioned between pairs of forward link ends 22b as described before; the distance 60 being sized to accommodate at least one of the forward link ends 22b.

The forward link ends 22b in the second section 46 are connected to the rearward link ends 26b in the second section 46 by way of connecting members 64 (FIG. 1). The connecting members 64 are interconnected by a cross member 66 (FIG. 1). The connecting members 64 interconnecting each forward link end 22b with a corresponding rearward link end 26b are offset at about a mid point forming a squared Z-shape with adjacent pairs of the connecting members 64 forming a somewhat offset H-shape. It should be noted that in lieu of the connecting members 64 and the cross members 66 interconnecting the forward link ends 22b with the rearward link ends 26b, a solid structure could be substituted forming a flat top conveying system or some other configuration if desired in a particular application.

The forward link ends 22a in the first section 44 are interconnected by way of connecting members 68 (FIG. 1). Each of the connecting members 68 extends about angularly from one of the forward link ends 22a to the interconnected corresponding rearward link end 26a. The connecting members 68 cooperate such that the connecting members 68 connecting one link end 22a with two link ends 26a forms a somewhat Y-shape.

The connecting members 68 each have a generally rectangularly shaped cross section. Each of the connecting members 68 has a thickness 70 (FIG. 1). The thickness 70 is sized to be as thin as practical for reasons which will be made more apparent below.

The forward link ends 22c in the third section 48 are interconnected by way of connecting members 72 (FIG. 1). Each of the connecting members 72 extends about angularly from one of the forward link ends 22c to the interconnected corresponding rearward link end 26c. The connecting members 72 cooperate such that the connecting members 68 connecting one of the link ends 22c with two of the link ends 26c forms a somewhat Y-shape.

The connecting members 72 each have a generally rectangularly shaped cross section. Each of the connecting members 72 has a thickness 74 (FIG. 1). The thickness 70 is sized to be as thin as practical for reasons which will be made more apparent below.

In a preferred embodiment, the connecting members 68 and 72 are virtually identical in shape and have identical thicknesses 70 and 74. By the same token, the first and the third distances 52 and 56 are about equal and the first and the third distances 58 and 62 are about equal. In short, the first and the third sections in one preferred embodiment are identical in construction which will permit the spiral conveyor belt 10 to be turned on a radius in either direction as will be made more apparent below. Alternately, the first and the third sections 44 and 48 may be constructed different to permit the spiral conveyor belt 10 to be turned on one radius in one direction and a different radius in an opposite direction. Further, the third section 48 could be eliminated if desired in a particular application, although in this instance the spiral conveyor belt 10 would be adapted to turn in only one direction.

Shown in FIG. 4 is a tapered link shaft 30. Each link shaft 30 has a first end 80 and a second end 82. A portion of the link shaft 30 near the first end 80 thereof is tapered inwardly toward the first end 80 forming a tapered first section 84 of the link shaft 80. A mid section of the link shaft 30 forms a non-tapered second section 86 of the link shaft 30. A portion of the link shaft 30 near the second end 82 is tapered toward the second end 82 forming a tapered third section 88 of the link shaft 30.

The tapered first section 84 extends from the first end 80 a distance toward the second end 82. The non-tapered second section 86 extends a distance from the tapered first section 84 toward the second end 82. The tapered third section 88 extends from the non-tapered second section 86 to about the second end 82.

The link shaft 30 has a diameter 90 in the non-tapered second section 86. The link shaft 30 is tapered in the tapered first section 84 to a diameter 92 at the first end 80. The link shaft 30 is tapered in the tapered third section 88 to a diameter 94 at the second end 82. The diameters 92 and 94 are about equal and the diameters 92 and 94 each are smaller than the diameter 90.

When the link shafts 30 are positioned through the aligned forward shaft openings 24 and rearward shaft openings 28, the link shafts 30 are sized so that the first end 80 of each of the link shafts 30 is disposed near the first side 18 of the link assemblies 12 and the second end 82 of the link shafts 30 is disposed near the second side 20 of the link assemblies 12. Further, each of the link shafts 30 is sized so that the tapered first section 84 of each of the link shafts 30 extends through the first section 44 of the link assemblies 12, the non-tapered second section 86 of the link shafts 30 extends through the second sections 46 of the link assemblies 12 and the tapered third section 88 of each of the link shafts 30 extends through the third sections 48 of the link assemblies 12. In other words, the length of the tapered first section 84 is about equal to the length of the first section 44, the length of the non-tapered second section 86 is about equal to the length of the second section 46, and the length of the tapered third section 88 is about equal to the length of the third section 44.

The forward shaft openings 24b in the second sections 46 each have a diameter 96 (FIG. 5) which is slightly larger than the diameter 90 of the link shafts 30 throughout the non-tapered second sections 86. The rearward shaft openings 28b in the second sections 46 are oblong shaped so as to have a length 98 which allows the link assemblies 12 to collapse and expand as is required. As the conveyor belt 10 is traveling in a straight line the link assemblies 12 are expanded or in tension. However, as the conveyor belt 10 travels about a fixed radius as depicted in FIG. 3, the link assemblies 12 collapse or compress relative to one another at the first side 18 but remain in tension at the second side 20 thereby rotating one link assembly 12 in a coplanar relation to an adjacent link assembly 12 and thus forming a curve in the conveyor belt 10 which allows the conveyor belt 10 to travel about the fixed radius. It should be noted that the forward shaft openings 24b and the rearward shaft openings 28b may be formed on a radius so that the link shaft rolls in the forward and the rearward shaft openings 24b and 28b in a manner described in U.S. Pat. No. 4,972,942, titled CONVEYOR BELT, issued Nov. 27, 1990, which disclosure hereby is incorporated herein by reference.

The forward shaft openings 24a or 24c in the first and third sections 44 and 48 each are oblong shaped and have a length 100 (FIG. 6) and the length 100 is greater than the diameters 90, 92 or 94 of the link shafts 30 to permit movement of the first or third sections 84 and 88 of the link shafts 30 in the forward shaft openings 24a and 24c, respectively. The rearward shaft openings 28a or 28c in the first and third sections 44 and 48 each are oblong shaped and have a length 102 (FIG. 6) and the length 102 is greater than the diameters 90, 92 or 94 of the link shafts 30 to permit movement of the first or third sections 84 and 88 of the link shafts 30 in the rearward shaft openings 28a or 28c, respectively. The lengths 100 and 102 are about equal and each of the lengths 100 and 102 is larger than the diameter 92 or 94 of the link shafts 30.

When the spiral conveyor belt 10 or a portion thereof is moving in the forward direction 36, the non-tapered second section 86 of the link shaft 30 is engaged by adjacent portions of the forward and rearward link ends 22b and 26b and carries substantially all of the load transmitted throughout the spiral conveyor belt 10. In this instance, virtually none of the load is carried by the tapered first and third sections 84 and 88 of the link shaft 30.

As the conveyor belt 10 begins traveling along a radial path as is illustrated in FIG. 2, the link assemblies 12 decelerate toward the first end 18 and thus rotate relative to one another about the outermost rearward link end 26 which, as illustrated herein is at the second side 20. The tensile load is transferred toward the second side 120 of the link assemblies 12 to the tapered third section 88 such that the load on the link shaft 30 is carried by the tapered third section 88.

The configuration of the first section 44 and the third section 48 allows the conveyor belt 10 to turn on as small a radius as possible. The radius on which a conveyor belt can turn is typically limited by the distance that the link assemblies are able to rotate relative to one another. In other words, the radius on which a conveyor belt can turn is limited by the translational and rotational movement permitted between adjacent link assemblies 12. While the length of the oblong openings would seem to be the limiting factor, the conveyor belt is typically not able to fully utilize the entire length of the oblong openings because of structural interference between adjacent link assemblies as the link assemblies collapse together and because of the straight configuration of conventional link shafts.

The Y-shaped configuration of the first and third sections 44 and 48 allow the link assemblies to collapse or nest to the greatest extent permitted by the length of the oblong opening. More specifically, the Y-shaped configuration enables the link assemblies 12 to nest closer together such that the connecting structure of the link assemblies 12 does not interfere with the movement of the link assemblies 12 relative to one another and thus provide greater translational movement between adjacent link assemblies 12 when the conveyor belt 10 is traveling on a radius.

The configuration of the first and third section 44 and 48 further enhances the ability of the conveyor belt 10 to turn on as small a radius as possible in that as the spiral conveyor belt 10 is turned on the radius 38, the forward link ends 22a are laterally compressed thereby causing the distances 52 to be decreased and causing the forward link ends 22a to be moved in directions generally toward each other. Further, as the spiral conveyor belt 10 is turned on the radius 38, the rearward link ends 26a are laterally expanded thereby increasing the distances 58 and moving the rearward link ends 26a in directions generally away from each other. The lateral collapsing and expanding of the forward and rearward link ends 22a and 26b permits an even greater coplanar rotational movement to be achieved between adjacent link assemblies 12. The collapsing and expanding of the forward and rearward link ends 22a and 26a is permitted by the Y-shaped connecting members 68 interconnecting the forward link ends 22a with the rearward link ends 26a. The thicknesses 70 of the connecting members 68 in the first section 44 are sized to be as small as possible to permit the maximum lateral collapsibility and expendability of the connecting members 64 and the corresponding forward and rearward link ends 22a and 26a thereby permitting the spiral conveyor belt 10 to be turned on the radius 38 as small as possible.

The tapered first section 84 of the link shafts 30 cooperates with the elongated forward and rearward shaft openings 24a and 28a to permit the tapered first section 84 of the link shafts 30 to move the maximum distance within the forward shaft openings 24a and the rearward shaft openings 28a as the spiral conveyor belt 10 is turned on the radius 38 thereby minimizing the radius 38 upon which the spiral conveyor belt 10 may be turned.

Further, the tapered third section 88 of the link shafts 30 cooperates with the elongated forward and rearward shaft openings 24c and 28c in the third sections 48 of the link assemblies 12 so that the load carried on the non-tapered second section 86 is transferred to the tapered third section 88 of the link shafts 30 as the spiral conveyor belt 10 is turned on the radius 38. Thus, as the spiral conveyor belt 10 is turned on the radius 38, the load substantially is carried by the tapered third sections 88 of the link shaft 30 so as to distribute the load across a greater number of links as the spiral conveyor belt 10 is turned on the radius 38.

If the spiral conveyor belt 10 is turned on a radius in a direction opposite to that just described, the forward and rearward link ends 22c and 26c are expanded and compressed in a manner like that described before with respect to the forward and rearward link ends 24a and 26a and the load is transferred to the tapered first section 84.

It should be noted that the link shafts 30 each could be separated into two or more segments rather than a single integrally formed link shaft 30 as shown in FIG. 4. If the link shaft 30 is separate into two or more segments, preferably the link shafts 30 would be oriented in the spiral conveyor belt 10 so that the separations between the segments of one link shaft 30 are staggered with respect to the separations between the segments of an adjacent link shaft 30 for reinforcement purposes.

It is significant to note that the connecting members 68 and 72 are not interconnected with a cross member to permit the compression and expansion of the link ends 22a or 22c and 26a or 26c in the manner described before.

The link shafts 30 may be retained in place in a number of different ways. In one embodiment, a retainer is formed on the link shaft 30 shaped so that the link shaft 30 is forced through the appropriate openings and the retainer locks the link shafts 30 in place.

By forming the link assemblies with different ends the conveyor belt can be formed into the spiral belt described herein where the ends permit movement of one end relative to an adjacent end when the conveyor belt is turned, or the ends can be formed to form the conveyor belt to be driven in a straight line with no turning ability.

In one embodiment, the cross member extends between the upper and lower surfaces of the link assemblies, and a product would be conveyed on either one of the surfaces and the belt normally would be driven from the other surface. Preferably, the cross member extends from the upper surface a distance and is spaced a distance from the lower surface. In this manner, the belt can be driven from either the upper surface or the lower surface and the spacing permits a comb transfer member to be used with the belt if desired, and it also permits the belt to be interconnected in the form of a twisted circle.

EMBODIMENT OF FIGS. 7–12

Referring now to FIGS. 7, shown therein is another embodiment of a link assembly 112. The link assembly 112 preferably is integrally formed of a plastic or ceramic material, although it could be constructed of metal. The link assembly 112 includes a forward end 114, a rearward end 116, a first side 118 and a second side 120.

A plurality of spaced apart forward link ends 122 are formed on the forward end 114 of the link assembly 112. A forward shaft opening 124 (shown in FIG. 7 in dashed lines) is formed through each of the forward link ends 122. The forward shaft openings 124 are generally aligned. As best shown in FIG. 7A, the forward shaft openings 124 are substantially round.

The forward link ends 122 are further provided with a half circular projection 125 which extends from the same facing side of each forward link end 122 and circumscribes the forward shaft openings 124; the opposite side of the forward link end 122 being substantially flat. Projections 125 serve to provide lateral support to the link assemblies when assembled, and the half circular configuration of the projections 125 facilitates visual inspection of the link assembly 112 when interconnected with an adjacent link assembly 112 as described below.

A plurality of rearward link ends 126 are formed on the rearward end 116 of each of the link assemblies 112. The rearward link ends 126 on each of the link assemblies 112 have a relatively flat configuration and are spaced apart and dimensioned to be slidably received between the forward link ends 122 of an adjacent link assembly 112. A rearward shaft opening 128 (shown in dashed lines in FIGS. 7) is formed through each of the rearward link ends 126. The rearward shaft openings 128 are generally aligned.

The rearward shaft openings 128 are oblong shaped as best shown in FIG. 7A to provide a slot which allows for translational movement of the rearward link end 126 relative to the forward link end 122 of an adjacent link assembly 112 in a manner described in further detail hereinbelow. A portion of the rearward link end 126 defining the rearward shaft opening 128 provides a shaft engaging surface 129 which is preferably shaped so as to provide a surface having a radius greater than the radius of the forward shaft opening 124. It will be appreciated, however, by those skilled in the art that the shaft engaging surface 129 can be formed to be any shaped desired.

As shown in FIG. 7, each forward link end 122 is integrally connected to one of the rearward link ends 126 in such a manner that the forward link ends 122 and the rearward link ends 126 are parallel to and laterally offset from each other.

Each of the forward link ends 122 and each of the rearward link ends 126 are interconnected by a cross member 130. As best shown in FIG. 7A, the cross member 130 extends from the lower surface of the link assembly 112 to a point substantially level with the upper surface of the link assembly 112, or preferably, to a point below the upper surface of the link assembly 112. In this manner, the belt can be driven from either the upper surface or the lower surface and the spacing permits a comb transfer member to be used with the belt if desired. The cross member 130 has a wedge-shaped cross section (FIG. 7A) which prevents residue, such as crumbs and excess material from becoming compacted between the link assemblies in a manner well known in the art.

While the link assembly 112 has been described and depicted herein as having an upper surface and a lower surface, it should be noted that this is merely for the purpose of simplifying and clarifying the description of the present invention. In use, either surface of the link assemblies 112 can be utilized as the surface on which product is transported. Normally, the link assembly 112 will be driven from the opposite surface on which a product is disposed.

Each link assembly 112 is further provided with an end link 132 and an end link 134 formed on the ends of the cross member 130, respectively. The end link 132 and the end link 134 are substantially identical in construction. Thus, only the end link 134 will be described in detail with reference to FIG. 7.

The end link 134 has a forward link end 136 formed on the forward end 114 of each link assembly 112. The forward link end 136 is spaced from the adjacent forward link end 122 a distance equal to the distance between each of the forward link ends 122. The forward link end 136 is preferably thicker than the forward link ends 122 to provide additional support and strength along the second side 120 of the link assembly 112. The forward link end 136 has a forward shaft opening 138 formed therethrough which is generally aligned with the forward shaft openings 124.

The forward link end 136 has a projection 139 which extends inwardly from the lower surface of the forward link end 136. Projection 139 serves to provide lateral support in the same manner as the projections 125 described above when the link assemblies 112 are assembled.

The end link 134 has a rearward link end 140 formed on the rearward end 116 of each link assembly 112. Like the forward link end 136, the rearward link end 140 is preferably thicker than the rearward link ends 126. The rearward link end 140 is formed to have a relatively flat configuration and to extend parallel to the rearward link ends 126. The rearward link end 140 is spaced from the adjacent rearward link end 126 a distance equal to the distance between each of the rearward link ends 126.

A rearward shaft opening 142 (shown in dashed lines in FIGS. 7) is formed through the rearward link ends 140, and like the rearward shaft openings 128, the rearward shaft opening 142 is oblong shaped to allow for translational movement of the rearward link end 140 relative to the forward link end 136 of an adjacent link assembly 112. The rearward shaft opening 142 is generally aligned with the rearward shaft openings 128.

The end link 134 has a lower guide member 146 and an upper guide member 148. The lower guide member 146 projects outwardly from the lower surface of the end link 134 and has a generally concave upper surface 149 configured to receive the end of a link shaft which is described hereinbelow. The upper guide member 148 projects outwardly from the upper surface of the end link 134. The lower and upper guide members 146 and 148 are spaced apart so as to define a groove 150 dimensioned to receive a guide rail (not shown) which can be used to control the travel path of the link assemblies 112. The lower and upper guide members 146 and 148 are staggered relative to one another thereby allowing one to visually inspect the groove 150 and the guide rail (not shown) for debris and wear.

As mentioned above, the end link 132 is substantially identical in construction to the end link 134. Thus, the end link 132 has a forward link end spaced from the forward link ends 126. However, because of the parallel, offset configuration of the forward link ends 122 and the rearward link ends 126, a blank space is encountered between the forward link end of the end link 132 and the forward link ends 122. To fill the void, an extra forward link end 151 is provided between the forward link end of the end link 132 and the forward link ends 122. The extra forward link end 151 is connected to the cross member 130 an equal distance between the inside edge of the projection 139 of the end link 132 and the adjacent forward link end 122.

Referring now to FIG. 8, illustrated therein are four link assemblies 112a-112d fastened together to form a portion of a conveyor belt 152. To assemble the link assemblies 112a-112d together so as to form the conveyor belt 152, the forward end 114 of each link assembly 112 is disposed near the rearward end 116 of one of the other link assemblies 112 and positioned so that the forward link ends 122 on each of the link assemblies 112 are positioned between the rearward link ends 126 on one of the other link assemblies 112 with the forward shaft openings 124 being aligned with the rearward shaft openings 128. More particularly, each of the forward link ends 122 on each of the link assemblies 112 is disposed between two adjacent rearward link ends 126 on one of the other link assemblies 112 with the forward shaft openings 124 and the rearward shaft openings 128 being aligned.

The link assemblies 112 are shown to be fastened together with conventional link shafts or pins 153. The link shafts 153 are substantially round with a uniform diameter and extend the width of the link assemblies 112. Each of the link shafts 153 is disposed through the aligned forward shaft openings 124 and rearward shaft openings 128 to interconnect each of the link assemblies 112 with one of the other link assemblies 112 to form the conveyor belt 152.

Similar to the conveyor belt 10, the conveyor belt 152 is adapted to turn on a radius as a result of the link assemblies 112 being able to expand and collapse relative to one another. The oblong shape of the rearward shaft openings 128 and 142 allows for translational movement of the link assemblies 112 relative to one another and the forward and rearward link ends of adjacent link assemblies 112 are spaced to allow coplanar rotation of one link assembly 112 relative to an adjacent link assembly 112, thus enabling the link assemblies 112 to collapse and expand as is required. As the conveyor belt 152 is traveling in a straight line as is illustrated by link assemblies 112a and 112b in FIG. 8, the link assemblies 112 are expanded or in a state of tension. However, as the conveyor belt 152 travels about a fixed radius as is illustrated by link assemblies 112b-112d, the speed of the outermost link end, rearward link end 140 of the end link 134, remains constant, while the link ends toward the first end 118 decelerate and thus collapse or compress relative to one another. It should be noted that the configuration of the link ends 132 of the link assembly 112 reduces the degree to which adjacent link assemblies 112 can rotate or compress relative to the length of the rearward shaft openings 28 and 142. As illustrated in FIG. 8, the end links 132 contact each other before the link shaft 153 can move across the entire length of the rearward shaft opening 128. Thus, the link assemblies 112 are characterized as having an effective slot length which equals the amount of translational movement permitted between adjacent link assemblies 112 as the conveyor belt 152 is traveling on a radius.

The line extending over the length of the conveyor belt 152 where the belt speed does not vary is referred to herein as the pitch line. "Pitch line" as used herein is defined as the line where the straight running conveyor belt's pitch equals the turning belt's pitch. In other words, it is the line on the conveyor belt 152 where the belt velocity remains constant as the belt goes from straight to curved. The belt decelerates inside of the pitch line and loses tensile load, and the belt accelerates outside of the pitch line and takes on tensile loading. When using round link shafts 153, the pitch line is at the outermost rearward link end 140.

It has been common to use round link shafts or pins to interconnect link assemblies, such as the link assemblies 12 and 112 described above. While such shafts or pins have been relatively successful, problems have nevertheless been encountered. More specifically, as the conveyor belt is traveling along a straight line, the tensile load is distributed across all of the link ends. However, at the instant the conveyor belt begins to turn, the tensile load is transferred to the single outside link end 140 of the end link 134. With all of the load on a single link end, that particular link is highly susceptible to breakage.

The problem is greatly alleviated by utilization of the tapered link shaft 30 in the manner described above. Thus, while the number of link ends that carry the load when the conveyor belt is traveling in a straight line is reduced, the number of link ends which carry the load while the belt is traveling on a radius is increased.

Although the tapered link shaft 30 distributes the tensile load across a greater number of link ends while the conveyor belt is traveling on a radius, a single link end does nevertheless experience all of the load at the instant the conveyor belt starts into a turn and the load is being transferred to the tapered portion. The particular link end which experiences all of the load at the instant the conveyor belt starts to turn is the link end nearest the pitch line which is effectively moved away from the outer edge of the link assembly 112 toward the first side 118 with use of the tapered link shaft 30. That is, the intersection of the tapered first section 84 and the nontapered second section 86 of adjacent link assemblies define the pitch line whereby a portion of each link assembly extending radially outward from the pitch line accelerates relative to the pitch line and a portion of each link assembly extending radially inward from the pitch line decelerates relative to the pitch line as the link assemblies are traveling on a radius and the tapered first section 84 is on the outer edge of the conveyor belt. Likewise, the intersection of the tapered third section 88 and the nontapered second section 86 of adjacent link assemblies define the pitch line whereby a portion of each link assembly extending radially outward from the pitch line accelerates relative to the pitch line and a portion of each link assembly extending radially inward from the pitch line decelerates relative to the pitch line as the link assemblies are traveling on a radius and the tapered third section 88 is on the outer edge of the conveyor belt. While a single link end carries all of the load for only an instant and the force experienced at the inwardly positioned pitch line is less than that experienced at the outer edge of the conveyor belt 112, excessive wear and eventually breakage of the link end can result over a period of time nevertheless.

Referring now to FIGS. 9 and 10, shown therein is a link shaft 154 constructed in accordance with the present invention. As will become more clear below, the link shaft 154 is configured so as to not only distribute the tensile load between adjacent link assemblies over a greater number of link ends when the conveyor belt is turning on a radius, like the tapered link shaft 30, but the link shaft 154 is also configured to distribute the tensile load over a greater number of link ends at the instant the conveyor belt starts to turn.

The link shaft 154 is an elongated member preferably formed of a material having a low coefficient of friction, such as plastic, although it could be constructed of metal. The link shaft 154 is characterized has having a first end 156, a second end 158 and a longitudinal axis 160. In one embodiment, the second end 158 of the link shaft 154 is formed so as to have a button end 162 and a spring member 164 spaced apart from the button end 162. The button end 162 and the spring member 164 are dimensioned so as to retain the link shaft 154 within adjacent link assemblies 112 such that the link shaft 154 is rotatable within the forward and rearward shaft openings 124 and 128, respectively. In use, a spring plug (not shown) may be inserted in the forward shaft opening 138 of the end link 132 adjacent the first end 156 of the link shaft 154 if desired.

Figure 10A:
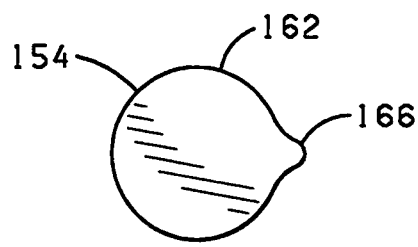
FIG. 10A is an end view of the link shaft of FIG. 10 illustrating a position indicator.

As best shown in FIG. 10A, the button end 162 is provided with a position indicator 166 extending radially from the button end 162. The position indicator 166 serves to indicate the rotational position of the link shaft 154 in a manner that will be described hereinbelow.

A portion of the link shaft 154 near the first end 156 thereof is tapered inwardly toward the first end 156 forming a tapered surface 168. A medial portion of the link shaft 154 is contoured to form a non-tapered or straight surface 170. A portion of the link shaft 154 near the second end 158 thereof is tapered toward the second end 158 forming a tapered surface 172. The tapered surface 168 extends from the first end 156 a distance toward the second end 158 and the tapered surface 172 extends from the second end 158 a distance toward the first end 156.

As will be described in further detail hereinbelow, the straight surface 170 functions to carry the tensile load between adjacent link assemblies 112 as the conveyor belt 152 is traveling in a straight path. The tapered surfaces 168 and 172 function to carry the tensile load between adjacent link assemblies 112 as the conveyor belt 152 is traveling on a radius. Of course, it will be realized that it depends in which direction the conveyor belt 152 is turning as to which tapered surface 168 or 172 the load is transferred.

The angle of the taper of the tapered surfaces 168 and 172 and the length of the tapered surfaces 168 and 172 vary in direct proportion to the configuration of the link assemblies 112 and the diameter of the link shaft 154.

The taper angle 174 of the tapered surfaces 168 and 172 is given by:

$$U = \text{Tan } C/W$$

where:
U = taper angle
C = effective slot length (amount of translational movement permitted between adjacent link assemblies)
W = conveyor belt width The length 175 that the tapered surface 168 extends toward the second end 158 of the link shaft 154 and the distance that the tapered surface 172 extends toward the first end 156 of the linkshaft 154 is given by:

$$L = (Dmax - Dmin)/\text{Tan } U$$

where:
L = length of tapered surface
Dmax = maximum shaft diameter
Dmin = minimum shaft diameter
U = taper angle The link shaft 154 has a maximum shaft diameter 176 and a minimum shaft diameter 178 at the ends of the tapered surfaces 168 and 172. The maximum shaft diameter 176 is sized such that the link shaft 154 is capable of carrying the tensile load of the link assemblies 112 while remaining rotatable when the link shaft 154 is disposed within the forward and rearward shaft openings 124 and 128. The minimum shaft diameter 178 which is located at the first and second ends 156 and 158 is sized so as provide sufficient durability to the link shaft 154, and yet provide sufficient flexibility to the tapered surfaces 168 and 170 to facilitate the dispersal of load increases placed on the shaft link 154 due to chordial action, mechanical interference, variation in product loading, and changes in friction factor caused by foreign matter and temperature change.

Figure 11A:
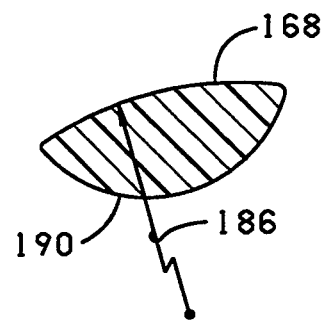
FIG. 11A is a cross sectional profile taken at 11A—11A in FIG. 10.
Figure 11B:
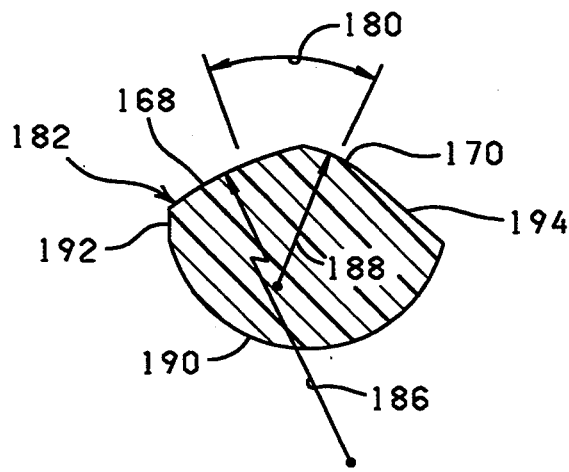
FIG. 11B is a cross sectional profile taken at 11B—11B in FIG. 10.

As illustrated in FIG. 11B, the straight surface 170 and the tapered surface 168 are disposed angularly about the longitudinal axis 166 relative to one another at an angle 180. The angle 180 between the straight surface 170 and the taper tapered surface 168 is shown herein as being approximately 30 degrees. However, it will be appreciated that the angle 180 between the straight surface 170 and the tapered surfaces 168 and 172 can range from greater than 0 degrees to less than 90 degrees.

The straight surface 170 extends from the tapered surface 168 to the tapered surface 172. More specifically, the straight surface 170 extends between the tapered surfaces 168 and 172 such that the straight surface 170 intersects each of the tapered surfaces 168 and 172. The angular relationship between the straight surface 170 and the tapered surfaces 168 and 172 results in a portion of each end of the straight surface 170 extending laterally adjacent to the tapered surfaces 168 and 172, respectively, so as to form a first transition zone 182 and a second transition zone 184. That is, the first transition zone 182 includes the portions of the tapered surface 168 and the straight surface 170 laterally adjacent to each other. Likewise, the second transition zone 184 includes the portions of the tapered surface 172 and the straight surface 170 laterally adjacent to each other. The length of the first and second transition zones 182 and 184 will increase as the angle 180 between the straight surface 170 and the tapered surfaces 168 and 172 increases.

As will be more fully described hereinafter, the transition zone 182 permits the rearward link ends 126 which are engaged with the straight surface 170 within the transition zone 182 when the conveyor belt 152 is in operation and under tension to be rotationally transferred to the tapered surface 168 so that the rearward link ends located in the transition zone 182 remain in contact with the link shaft 154 as the load is transferred from the straight surface 170 to the tapered surface 168 in response to the conveyor belt 152 traveling over a curved path. As described above, the load shifts to the outer edge of the link assembly 112 as the conveyor belt 152 begins to turn. In response, the link shaft 154 is compelled to rotate or twist the amount of angular displacement between the tapered surface 168 and the straight surface 170. It will be appreciated that if the spacing of the rearward link ends 126 and the length of the transition zone 182 or 184 are such that a plurality of rearward link ends 126 are engagable with the link shaft 154 within the transition zone 182 or 184, the tensile load will be distributed over a plurality of rearward link ends 126 at the instant the conveyor belt 152 begins to turn rather than a single rearward link end 126 when employing the link shaft 30.

So that the straight surface 170 and the tapered surfaces 168 and 172 remain operably positioned with respect to the shaft engaging surface 129 of the rearward shaft openings 128, the straight surface 170 and the tapered surfaces 168 and 172 are each adapted to substantially mesh with the shaft engaging surface 129 of the rearward shaft openings 128 and 142. That is, the straight surface 170 and the tapered surfaces 168 and 172 are contoured such that the straight surface 170 and the tapered surfaces 168 and 172 remain meshingly engaged with the shaft engaging surface 129 of the rearward shaft openings 128 and 142 when the conveyor belt 152 is traveling in either a straight path or a curved path, thereby ensuring that the straight surface 170 and the tapered surfaces 168 and 172 cooperate with the shaft engaging surface 129 to rotatingly transfer the load to either the straight surface 170 or one of the tapered surfaces 168 or 172.

Figure 11C:
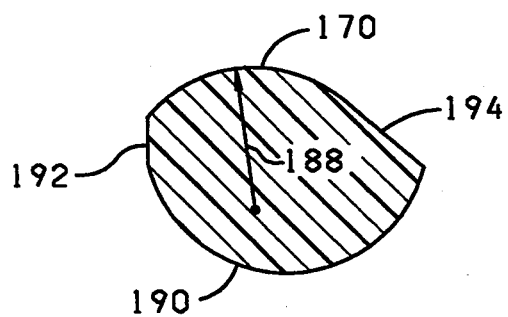
FIG. 11C is a cross sectional profile taken at 11C—11C in FIG. 10.

As shown in FIG. 11A, the tapered surface 168 is preferably contoured to have a radius 186 which substantially corresponds to the radius of the shaft engaging surface 129 of the rearward shaft openings 128 and 142 (FIGS. 7A and 7B, respectively). To this end, tapered surface 168 will substantially mesh with the shaft engaging surface 129 when the conveyor belt 152 is traveling along a radial path. FIG. 11C illustrates a preferred contour of the straight surface 170. The straight surface 170 has a radius 188 which is approximately identical to the opposing surface 190 of the link shaft 154. Thus, while the radius 188 of the straight surface 170 is less than the radius 186 of the tapered surface 168, the straight surface 170 substantially meshes with the shaft engaging surface 129 so as to cooperate with the shaft engaging surface 129 to ensure the straight surface 170 remains properly engaged with the shaft engaging surface 129 when the conveyor belt 152 is traveling along a straight path. The contour of the straight surface 170 further provides an intersection between the straight surface 170 and the tapered surfaces 168 and 172 such that the load carried on the link shaft 154 can be smoothly transferred from the straight surface 170 to one of the tapered surfaces 168 or 172 and back again. FIG. 11B is a cross section of the link shaft 154 along a portion of the first transition zone 182 illustrating the intersection of the straight surface 170 having radius 186 and the tapered surface 168 having radius 188.

To facilitate manufacturing of the link shaft 154 such that the various surfaces of the link shaft 154 interconnect in a substantially uniform manner, surface 192 is formed adjacent the portions of the tapered surfaces 168, 172 within the transition zones 182, 184, respectively, and extended along the link shaft 154 therebetween, and surface 194 is formed adjacent the portions of the straight surface 170 within the transition zones 182, 184 and extended along the link shaft 154 therebetween.

Figure 12:
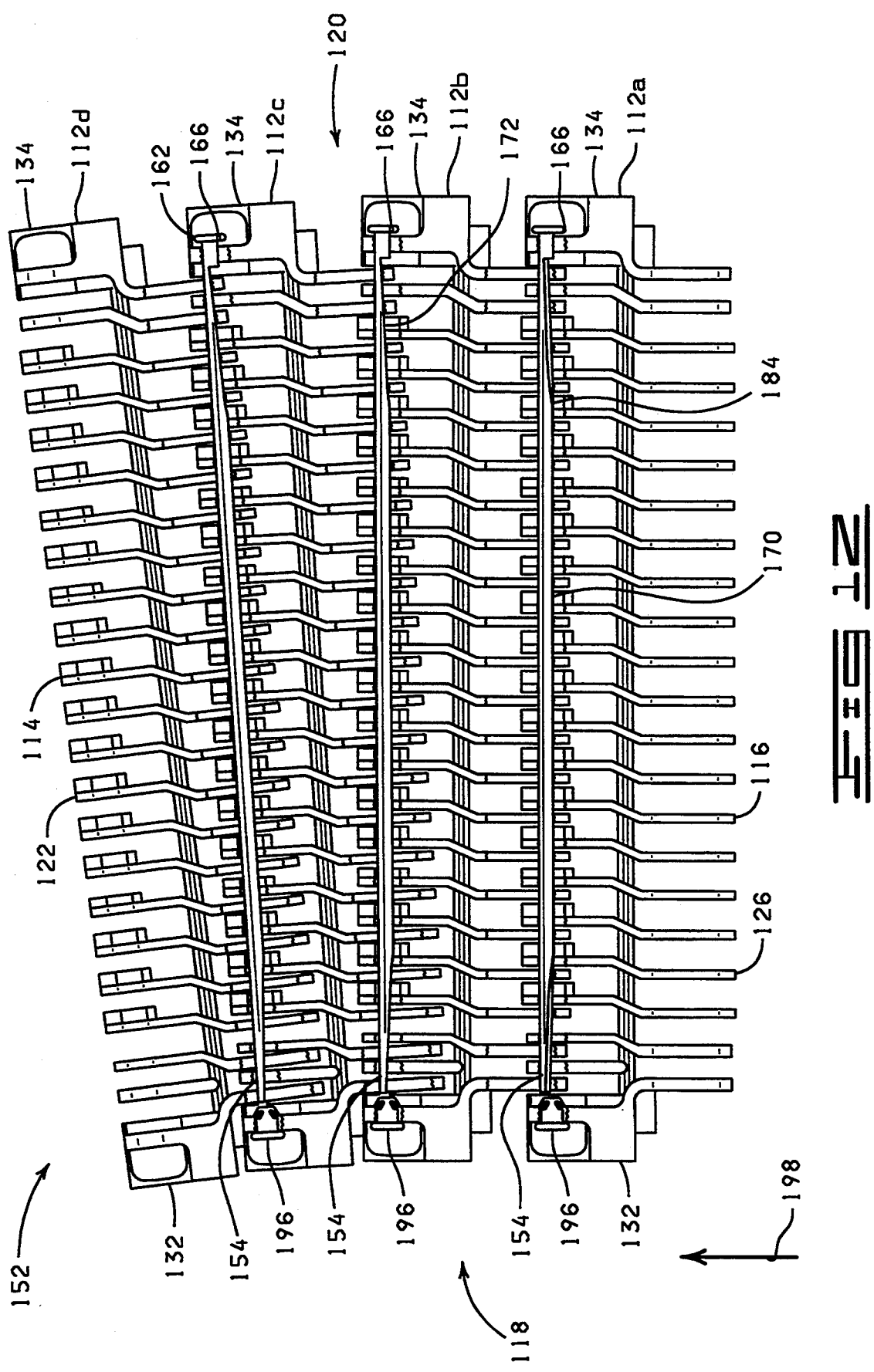
FIG. 12 is a partially cutaway, top view of four link assemblies interconnected with the link shaft in FIGS. 9 and 10, the link assemblies are illustrated traveling along a straight path and a radial path.

FIG. 12 is identical to FIG. 8 in that FIG. 12 illustrates four link assemblies 112a-112d fastened together to form the conveyor belt 152, except the link assemblies 112 are shown to be fastened together with the link shaft 154. To assemble the conveyor belt 152, the first end 156 of the link shaft 154 is disposed through the aligned forward shaft openings 124 and rearward shaft openings 128 until the spring member 164 is disposed through the forward link opening 138 of the end link 134. As shown, the link shafts 130 are sized so that the first end 156 of each of the link shafts 154 is disposed near the first side 118 of the link assemblies 112. Further, each of the link shafts 154 is sized so that the link shaft 154 is rotatably disposed through the aligned forward and rearward shaft openings 124 and 128, respectively. As mentioned above and illustrated in FIG. 12, a spring plug 196 can be inserted into the opposing forward shaft opening 138 of the end link 132.

When the spiral conveyor belt 152 is traveling in a general direction 198 along a straight path as is illustrated the link assemblies 112a and 112b in FIG. 12 and the link assemblies 112a and 112b are in tension, the shaft engaging surface 129 of the rearward shaft openings 128 engage the straight surface 170 such that the load on the link shaft 154 is carried by the straight surface 170 of the link shaft 154. In this instance, none of the load is carried by the tapered surfaces 168 or 172 of the link shaft 154.

As the conveyor belt 152 begins traveling along a curved path as is illustrated by the link assemblies 112b, 112c and 112d, the link assemblies 112b-112d decelerate toward the first side 118 and thus rotate relative to one another. The tensile load is transferred toward the second side 120 of the link assemblies 112 to the tapered surface 172 such that the load on the link shaft 154 is carried by the tapered surface 172. Obviously, if the conveyor belt 152 is turned on a radius in a direction opposite to that shown, the link assemblies 112b-112d decelerate toward the second side 120 and the load is transferred to the tapered surface 168 such that the load on the link shaft 154 is carried by the tapered surface 168.

As mentioned above, the advantage the link shaft 154 provides is that it distributes the load between adjacent link assemblies 112 over a greater number of link ends not only as the conveyor belt 152 is traveling in a curved path, but also at the instant when the conveyor belt 152 begins to turn so that one link end is not required to carry all of the load at any one point in time.

When the load is being transferred toward the second side 120 of the link assemblies 112, the link shaft 154 is compelled to rotate or twist the amount of angular displacement between the tapered surface 172 and the straight surface 170. As the link shaft 154 is rotating, the rearward link ends 126 which are engaged with the straight surface 170 within the transition zone 184 are transferred to the laterally adjacent tapered surface 172. Thus, the rearward link ends 126 positioned within the transition zone 184 remain in contact with the link shaft 154 as the load is transferred from the straight surface 170 to the tapered surface 168.

As illustrated in FIG. 12, the position indicator 166 extending from the button end 162 allows one to visually observe the conveyor belt 152 so as to ensure that the link shafts 154 are properly aligned in the link assemblies 112 and that the link shafts are rotating properly. The position indicator 166 also cooperate with the lower guide member 146 to prevent the link shaft 154 from rotating more than 180 degrees. While the configuration of the link shaft 154 and the forward and rearward shaft openings causes the link shaft 154 to be effectively self-aligning within the aligned forward and rearward shaft openings 124 and 128, occasionally debris may cause the link shaft 154 to get stuck so that it is unable to rotate to the proper position. To prevent such an occurrence, a bump member (not shown) may be selectively installed along the path of the conveyor belt 152 to substantially jar conveyor belt 152 so that the link shaft 154 remains rotatably disposed within the link assemblies 112.

It should be noted that the link shaft 154 can be separated into two or more segments rather than a single integrally formed link shaft 154 as shown in FIG. 9 and 10. If the link shaft 154 is separate into two or more segments, preferably the link shaft 154 would be oriented in the conveyor belt 152 so that the separations between the segments of one link shaft 154 are staggered with respect to the separations between the segments of an adjacent link shaft 154 for reinforcement purposes.

While the link shaft 154 has been described above in reference with link assemblies 112, it will be understood that the link shaft 154 can be employed with the link assemblies 12 described above, as well as, other link assembly configurations adapted to turn on a radius.

EMBODIMENT OF FIGS. 13 and 14

FIGS. 13 and 14 illustrate another embodiment of a link assembly 200 constructed in accordance with the present invention. The link assembly 200 is substantially identical in construction to the link assembly 112 described above in reference to FIG. 7, except as described hereinbelow. Therefore, like numerals are used in FIGS. 13 and 14 to designate like components.

Link assembly 200 includes rearward link ends 126 on the rearward end 116. A rearward shaft opening 128a is formed through each of the rearward link ends 126. The rearward shaft openings 128a are oblong shaped to provide a slot which allows for translational movement of the rearward link end 126 relative to the forward link end 122 of an adjacent link assembly 200 in a manner described hereinabove.

As previously mentioned, the advantage of the present invention is that it shifts the pitch line of the link assemblies inwardly, thereby reducing the load placed on a single point or link end when the conveyor belt is traveling on a radius. It will be appreciated that the pitch line can be shifted inwardly by tapering a portion of the link shaft openings rather than by tapering the link shaft as described hereinabove. To this end, the rearward link ends 126 are separated into a tapered first section 202 located proximate the first side 118 of the link assembly 200, a nontapered second section 204, and a tapered third section 206 located proximate the second side 120 of the link assembly 200. The nontapered second section 204 comprises a plurality of rearward link ends 126 each having a pair of nontapered link shaft engaging surfaces 208a and 208b which are identical to the link shaft engaging surfaces 129 shown in FIGS. 7 and 7A.

The tapered first section 202 comprises a plurality of rearward link ends 126 with each having a pair of tapered link shaft engaging surfaces 210a and 210b. Similarly, the tapered third section 206 comprises a plurality of rearward link ends 126 with each having a pair of link shaft engaging surfaces 212a and 212b. The tapered link shaft engaging surfaces 210a, 210b and 212a, 212b are tapered outwardly and the link shaft openings 128 of the tapered first section 202 are of increasing length so as to angularly offset a portion of the rearward link shaft openings 128a in the tapered first section 202 and the tapered third section 206. Thus, the outwardly tapered link shaft engaging surfaces 210a and 210b of the tapered first section 202 are aligned with one another and outwardly divergent with respect to nontapered link shaft engaging surfaces 208a and 208b, as shown, and the outwardly tapered link shaft engaging surfaces 212a and 212b of the tapered third section 206 are aligned with one another and outwardly divergent with respect to the non tapered link shaft engaging surfaces 208a and 208b, as shown.

FIG. 14 illustrates two link assemblies 200 partially cutaway to show the link assemblies 200 interconnected with a conventional round link shaft, such as link shaft 153. The link assemblies 200 are further shown traveling on a radius where the first side 118 of the link assemblies 200 comprise an inside edge and the second side 120 of the link assemblies 200 comprise an outer edge. As the link assemblies 200 begin traveling along a radial path, the link assemblies 200 decelerate toward the first side 118 and thus rotate relative to one another. The tensile load is transferred toward the second side 120 of the link assemblies 200, thereby causing the link shaft 153 to engage the tapered link shaft engaging surface 212a of the tapered third section 206. This results in the load between adjacent link assemblies 200 being distributed across several rearward link ends 126 as the link assemblies 200 are traveling on a radius, thus reducing the link assemblies susceptibility to breakage. Obviously, if the link assemblies 200 are turned on a radius in a direction opposite to that shown, the link assemblies 200 decelerate toward the second side 120 and the load is distributed across the tapered link shaft engaging surfaces 210a of the tapered first section 202.

When adjacent link assemblies 200 are traveling along a straight path and the link assemblies 200 are in tension, similar to that illustrated in FIG. 8, the link shaft 153 engages the nontapered link shaft engaging surfaces 208a of the nontapered second section 204 such that the load between adjacent link assemblies 200 is distributed across the nontapered link shaft engaging surfaces 208a of the nontapered second section 204.

While the tapered configuration of the shaft openings has been described herein as being incorporated into a link assembly substantially identical to link assembly 112, it will be understood that the tapered configuration of the shaft openings can be incorporated into link assembly 12 described above, as well as, other link assembly configurations adapted to turn on a radius. In addition, the tapered openings are not limited to being formed in the rearward link ends, tapered openings can also be formed in the forward link ends.

Changes may be made in the construction and the operation of the various components, elements and assemblies described herein without departing from the spirit and scope of the invention as defined in the following claims.

What is claimed is:
1. A conveyor belt, comprising:
a plurality of link assemblies adapted to be interconnected so as to permit coplanar rotational movement relative to one another; and
a link shaft having a first end, a second end, and a medial portion, the link shaft rotatably disposed through adjacent link assemblies to interconnect adjacent link assemblies so as to permit coplanar rotational movement of adjacent link assemblies relative to one another, the link shaft having a longitudinal axis, the medial portion of the link shaft having a non-circular cross section forming an outer peripheral surface on the link shaft engagable with a portion of one of the link assemblies such that the surface on the medial portion of the link shaft carries the tensile load between adjacent link assemblies as the link assemblies are traveling along a straight path, the link shaft having a tapered surface formed on the link shaft extending from the first end a distance toward the second end and engagable with a portion of one of the link assemblies such that the tapered surface carries the tensile load between adjacent link assemblies as the link assemblies are traveling on a radius, the tapered surface being angularly displaced about the longitudinal axis relative to the surface on the medial portion of the link shaft and the tapered surface intersecting the surface on the medial portion of the link assembly with a portion of the tapered surface extending laterally adjacent a portion of the surface on the medial portion of the link shaft to define a transition zone, the surface on the medial portion of the link shaft and the tapered surface cooperating with the portions of the link assembly engagable with the surface on the medial portion of the link shaft and the tapered surface to cause the link shaft to rotate about the longitudinal axis when the link assemblies change from traveling along the straight path to the radius thereby laterally transferring the tensile load on the surface on the medial portion of the link shaft to the tapered surface along the transition zone.

2. The conveyor belt of claim 1 wherein the angle between the surface on the medial portion of the link shaft and the tapered surface is greater than 0 degrees and less than 90 degrees.

3. A conveyor belt adapted to turn on a radius, the conveyor belt comprising:

a plurality of link assemblies adapted to be interconnected so as to permit coplanar rotational movement relative to one another, each link assembly having a forward end, a rearward end, a first side and a second side, each link assembly having a plurality of spaced apart forward link ends formed on the forward end thereof and a plurality of spaced apart rearward link ends formed on the rearward end thereof, each forward link end having a forward shaft opening which is generally aligned with the forward shaft opening of each of the other forward link ends and each rearward link end having an oblong rearward shaft opening which is generally aligned with the rearward shaft opening of each of the other rearward link ends, each of the rearward link ends having a shaft engaging surface, the forward link ends of one link assembly being disposed between the rearward link ends of another link assembly such that the forward shaft openings and the rearward shaft openings are generally aligned; and a link shaft having a first end, a second end, and a medial portion, the link shaft rotatably disposed through the aligned forward and rearward shaft openings of adjacent link assemblies to interconnect adjacent link assemblies so as to permit coplanar rotational movement of adjacent link assemblies relative to one another, the link shaft having a longitudinal axis, the medial portion of the link shaft having a non-circular cross section forming an outer peripheral surface on the link shaft engagable with a portion of the link shaft engaging surfaces of one of the link assemblies such that the surface on the medial portion of the link shaft carries the tensile load between adjacent link assemblies as the link assemblies are traveling along a straight path, the link shaft having a tapered surface formed on the link shaft extending from the first end a distance toward the second end and engagable with a portion of the link shaft engaging surfaces of one of the link assemblies such that the tapered surface carries the tensile load between adjacent link assemblies as the link assemblies are traveling on a radius, the tapered surface being angularly displaced about the longitudinal axis relative to the surface on the medial portion of the link shaft and the tapered surface intersecting the surface on the medial portion of the link shaft with a portion of the tapered surface extending laterally adjacent a portion of the surface on the medial portion of the link shaft to define a transition zone, the surface on the medial portion of the link shaft and the tapered surface cooperating with the link shaft engaging surfaces to cause the link shaft to rotate about the longitudinal axis when the link assemblies change from traveling along the straight path to the radius thereby laterally transferring the tensile load on the surface on the medial portion of the link shaft to the tapered surface along the transition zone.

4. The conveyor belt of claim 3 wherein the angle between the surface on the medial portion of the link shaft and the tapered surface is greater than 0 degrees and less than 90 degrees.

5. The conveyor belt of claim 3 wherein the transition zone has a length such that more than one of the rearward link ends is engaged with the link shaft along the transition zone as the link assemblies change from traveling along the straight path to traveling on the radius.

6. A conveyor belt adapted to turn on a radius where the conveyor belt has a first side and a second side and the radius is defined as a distance extending from a point spaced a distance from the first side of the conveyor belt to the first side of the conveyor belt, the conveyor belt comprising:

a plurality of link assemblies adapted to be interconnected so as to permit coplanar rotational movement relative to one another, each link assembly having a forward end, a rearward end, a first side and a second side, a plurality of forward link ends being formed on the forward ends of each of the link assemblies with the forward link ends of each link assembly being spaced along the forward end of the link assembly, a forward shaft opening being formed through the forward link ends, a plurality of rearward link ends being formed on the rearward end of each link assembly with the rearward link ends of each link assembly being spaced along the rearward end of the link assembly, an oblong rearward shaft opening being formed through the rearward link ends on each of the link assemblies, each of the rearward link ends having a shaft engaging surface, the forward end of each link assembly being disposed near the rearward end of another link assembly with the forward shaft openings on each link assembly being aligned with the rearward shaft openings of an adjacent link assembly, the first side of each of the link assemblies cooperating with the first sides of the other link assemblies to form the first side of the conveyor belt and the second side of each of the link assemblies cooperating with the second sides of the other link assemblies to form the second side of the conveyor belt, each link assembly being divided into at least two sections comprising a first section extending from the first side of the link assembly a distance toward the second side of the link assembly, and a second section extending a distance from the first section toward the second side of the link assembly, the forward link ends in the first section being spaced a distance apart and the rearward link ends in the first section being spaced a distance apart, and the forward link ends in the first section being connected to the rearward link ends in the first section by connecting members such that the forward link ends and the connecting members connected thereto are collapsible generally toward each other or expandable generally away from each other as the link assemblies are turned on the radius and such that the rearward link ends and the connecting members connected thereto are collapsible generally toward each other or expandable generally away from each other as the link assemblies are turned on the radius; and a link shaft having a first end, a second end, and a medial portion, the link shaft rotatably disposed through the aligned forward and rearward shaft openings of adjacent link assemblies to interconnect adjacent link assemblies so as to permit coplanar rotational movement of adjacent link assemblies relative to one another, the link shaft having a longitudinal axis, the medial portion of the link shaft having a non-circular cross section forming an outer peripheral surface on the link shaft engagable with a portion of the link shaft engaging surfaces of one of the link assemblies such that the surface on the medial portion of the link shaft carries the tensile load between adjacent link assemblies as the link assemblies are traveling along a straight path, the link shaft having a tapered surface formed on the link shaft extending from the first end a distance toward the second end and engagable with a portion of the link shaft engaging surfaces of one of the link assemblies such that the tapered surface carries the tensile load between adjacent link assemblies as the link assemblies are traveling on the radius, the tapered surface being angularly displaced about the longitudinal axis relative to the surface on the medial portion of the link shaft and the tapered surface intersecting the surface on the medial portion of the link shaft with a portion of the tapered surface extending laterally adjacent a portion of the surface on the medial portion of the link shaft to define a transition zone, the surface on the medial portion of the link shaft and the tapered surface cooperating with the link shaft engaging surfaces to cause the link shaft to rotate about the longitudinal axis when the link assemblies change from traveling along the straight path to the radius thereby laterally transferring the tensile load on the surface on the medial portion of the link shaft to the tapered surface along the transition zone.

7. The conveyor belt of claim 6 wherein the connecting members connecting two of the forward link ends in the first section of each of the link assemblies to one of the rearward link ends has a Y-shaped configuration such that adjacent link assemblies are more closely nestable at the first section than at the second section.

8. The conveyor belt of claim 6 wherein the angle between the surface on the medial portion of the link shaft and the tapered surface is greater than 0 degrees and less than 90 degrees.

9. The conveyor belt of claim 6 wherein the transition zone has a length such that more than one of the rearward link ends is engaged with the link shaft along the transition zone as the link assemblies change from traveling along the straight path to traveling on the radius.

* * * * *